(12) United States Patent
Collins

(10) Patent No.: US 12,305,990 B2
(45) Date of Patent: May 20, 2025

(54) ORIENTING A MOVING ELECTROMAGNETIC TRACKING REFERENCE FRAME VIA EXTERNAL LOCALIZING DATA ON AN ELECTROMAGNETIC SENSOR USING IMU DATA

(71) Applicant: Penumbra, Inc., Alameda, CA (US)

(72) Inventor: Michael D. Collins, Fremont, CA (US)

(73) Assignee: Penumbra, Inc., Alameda, CA (US)

( * ) Notice: Subject to any disclaimer, the term of this patent is extended or adjusted under 35 U.S.C. 154(b) by 616 days.

(21) Appl. No.: 17/739,929

(22) Filed: May 9, 2022

(65) Prior Publication Data

US 2023/0081228 A1 Mar. 16, 2023

Related U.S. Application Data

(60) Provisional application No. 63/277,732, filed on Nov. 10, 2021, provisional application No. 63/245,131, filed on Sep. 16, 2021.

(51) Int. Cl.
| | |
|---|---|
| *G01C 21/16* | (2006.01) |
| *A63F 13/216* | (2014.01) |
| *G01D 5/20* | (2006.01) |
| *G06F 3/01* | (2006.01) |

(52) U.S. Cl.
CPC .......... *G01C 21/165* (2013.01); *A63F 13/216* (2014.09); *G01D 5/20* (2013.01); *G06F 3/012* (2013.01)

(58) Field of Classification Search
CPC .................................................... G01C 21/165
USPC ............................................................ 73/493
See application file for complete search history.

(56) References Cited

U.S. PATENT DOCUMENTS

| | | | |
|---|---|---|---|
| 4,737,794 A | 4/1988 | Jones | |
| 2017/0350961 A1* | 12/2017 | Hill | G01S 5/0036 |
| 2018/0239144 A1* | 8/2018 | Woods | A63F 13/213 |
| 2019/0041980 A1 | 2/2019 | Trythall et al. | |
| 2019/0113966 A1 | 4/2019 | Connellan et al. | |
| 2019/0187779 A1 | 6/2019 | Miller | |
| 2019/0242952 A1 | 8/2019 | Schneider et al. | |

* cited by examiner

*Primary Examiner* — Walter L Lindsay, Jr.
*Assistant Examiner* — Philip T Fadul
(74) *Attorney, Agent, or Firm* — Haley Guiliano LLP

(57) ABSTRACT

A method and apparatus for determining pose of a transmitter, and by extension the pose of one or more receivers, in an electromagnetic tracking system when the transmitter is allowed to move freely in the physical environment. The method operates in a system that incorporates two separate tracking technologies and an Inertial Measurement Unit, one determining the pose of a device relative to a global reference frame and another determining the pose of the same device relative to a local reference frame, thereby avoiding the latency problem and resulting inaccuracy of pose determinations of known prior approaches.

13 Claims, 6 Drawing Sheets

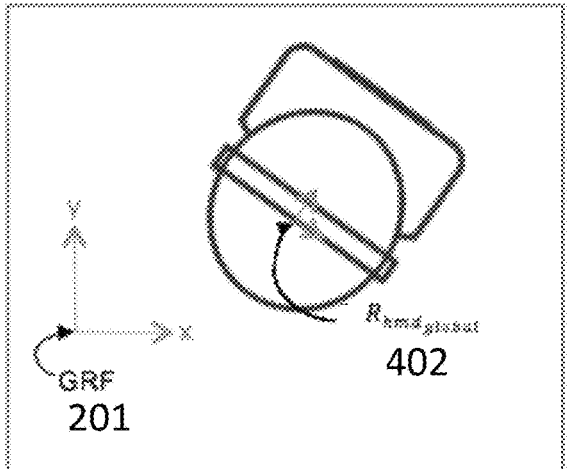
Fig. 4 showing rotation of HMD in global reference frame
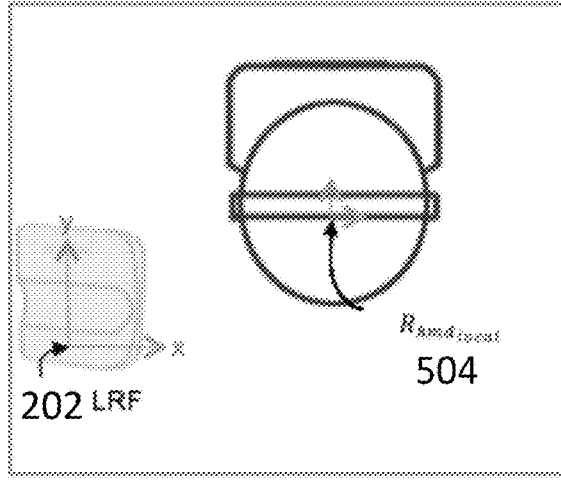
Fig. 5 showing rotation of HMD in local reference frame (of the TX coils)
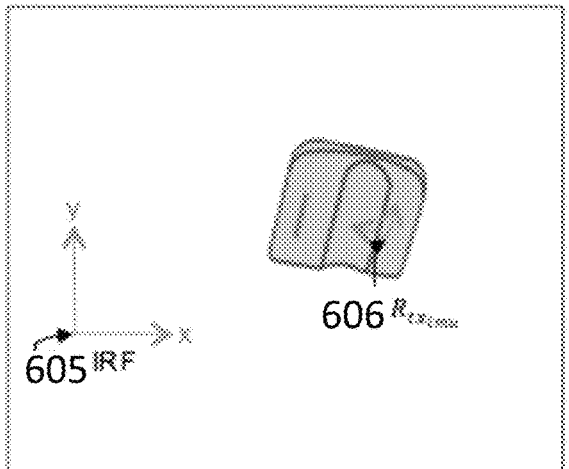
Fig. 6
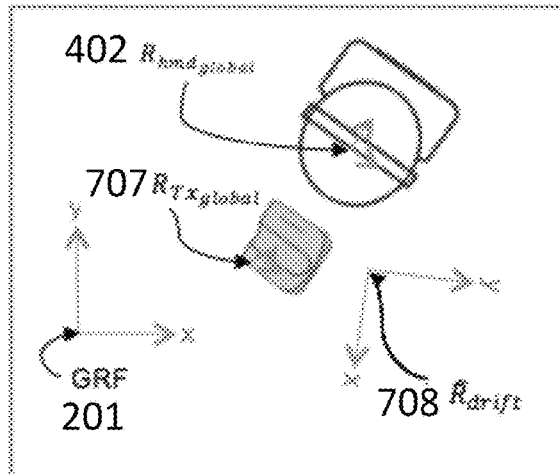
Fig. 7

ORIENTING A MOVING ELECTROMAGNETIC TRACKING REFERENCE FRAME VIA EXTERNAL LOCALIZING DATA ON AN ELECTROMAGNETIC SENSOR USING IMU DATA

This application claims priority to U.S. Provisional Application No. 63/245,131, filed Sep. 16, 2021, and U.S. Provisional Application No. 63/277,732, filed Nov. 10, 2021, which are incorporated by reference herein in their entireties.

FIELD OF THE INVENTION

The present invention relates generally to magnetic tracking devices, and more particularly to locating a local reference frame within a global reference frame for such devices.

BACKGROUND OF THE INVENTION

Alternating current (AC) magnetic tracking systems, otherwise known as electromagnetic (EM) tracking systems, typically use a method in which magnetic fields are generated and measured using a system of orthogonal coils to generate position and orientation information which is used by a computer system. One common application is tracking a user for the purpose of playing a video game or being immersed in a virtual reality world.

In some prior art systems, a transmitter, also known as an emitter, has three orthogonal coils that generate the magnetic field signal, and may be located in a fixed position, such as in a local base station, video game console, or other apparatus. A receiver, also known as a sensor, in a tracking device similarly has three orthogonal magnetic field sensing coils, and provides information about the sensed magnetic field to a processor, which derives the position and orientation of the tracking device relative to the transmitter from such information.

Such electromagnetic tracking systems, and the processors which determine the position and orientation of such sensors, are well known to those of skill in the art. One such example, U.S. Pat. No. 4,737,794 ("the '794 patent") incorporated by reference herein, teaches a "method and apparatus for determining remote object orientation and position with an electromagnetic coupling." It shows a transmitter comprising a plurality of emitting or radiating antennas located at a source to provide a plurality of magnetic fields spanning three dimensional space and defining a source reference coordinate frame, and a receiver comprising a plurality of sensing or receiving antennas located on an object to be tracked for receiving that field. A processor receives the outputs from the receiving antennas and converts the received components of the transmitted magnetic fields into remote object position and orientation relative to the source reference coordinate frame. The antennas may be, for example, dipole antennas, loop antennas, or coil antennas.

In such a system having three transmitter antennas, a receiver generates a signal that is a 3×3 signal matrix, called a "SigMat," which represents a total of nine measures of the three transmitted magnetic fields; each column corresponds to the sensed field from a separate one of the three coils of the transmitter, and each row corresponds to a separate one of the three coils of the receiver. One example of a 3×3 matrix that might represent SigMat is:

| a11 | a12 | a13 |
| a21 | a22 | a23 |
| a31 | a32 | a33 | where a11 through a33 represent the nine measures of the three magnetic fields, one measure of each magnetic field by each of the three receiver coils. It is the evaluation of SigMat that results in a determination of the position and orientation of the receiver relative to the transmitter.

Some prior art systems do not locate the transmitter in a fixed location in the physical environment, such as a base station or video game console, and instead locate the transmitter as a unit to be worn by a user who is also wearing a head mounted display (HMD). This has the advantage of locating the transmitter in closer proximity to other sensors, including the HMD, being worn by the user.

However, locating the transmitter on the user means the transmitter is free to move and rotate as the user moves and rotates. This results in the source reference frame being a local reference frame in that it is relative to the moving and rotating transmitter. This is as opposed to being a global reference frame as would be the case if the transmitter were instead located in a fixed location in the physical environment as is the case when the transmitter is located in a local base station, video game console, or other apparatus placed in a static location in the physical environment.

Many virtual reality systems aim to locate sensing devices in the global reference frame when determining the location of the sensing devices relative to other objects existing or operating in the same physical space in order to properly display on the HMD the various objects in the virtual reality space. One known approach is to determine the pose (i.e., the position and orientation) of one of the sensing devices in both the local reference frame and the global reference frame in order to then locate the transmitter in the global reference frame as well. However, in such systems, should the pose of the sensing device change between the time the local reference frame and the time the global reference frame are determined (referred to herein as latency), locating the transmitter in the global reference frame will then be inaccurate, as explained further elsewhere herein.

What is needed is an improved way of determining the position and orientation of a transmitter, which is allowed to move freely in the physical environment, in the global reference frame that avoids this latency problem.

SUMMARY OF THE INVENTION

A system and method is disclosed which automatically determines pose of a transmitter, and by extension the pose of one or more receivers, in an electromagnetic tracking system when the transmitter is allowed to move freely in the physical environment.

One embodiment discloses a method of determining position and orientation of a transmitter, and by extension position and orientation of a receiver, in an electromagnetic (EM) tracking system comprising a head mounted display (HMD) having a head tracking technology, the transmitter comprising a plurality of source magnetic coils each configured to generate a magnetic field and a transmitter inertial measurement unit (IMU), and the receiver comprising a plurality of sensor magnetic coils configured to sense the magnetic fields, the method comprising: determining, by a processor, a rotation of the HMD relative to a Global Reference Frame (GRF) using the HMD head tracking technology; determining, by the processor, the rotation of the HMD relative to a Local Reference Frame (LRF) using the EM tracking system; determining, by the processor, a rotation of the transmitter relative to an Inertial Reference Frame (IRF) using the transmitter IMU; determining, by the processor, an unfiltered rotation of the transmitter relative to the GRF; determining, by the processor, an unfiltered rotation of the IRF relative to the GRF; determining, by the processor, a drift comprising a low-pass filtering of the unfiltered rotation of the IRF relative to the GRF; determining, by the processor, a rotation of the transmitter using the drift and the rotation of the transmitter relative to the IRF; determining, by the processor, the position of the HMD relative to the GRF; determining, by the processor, a position of the HMD relative to the LRF using the EM tracking system; determining, by the processor, a position of the transmitter relative to the GRF using the determined rotation of the HMD relative to the GRF, the determined rotation of the transmitter, and the determined position of the transmitter relative to the LRF; and determining, by the processor, a position and rotation of the receiver in the GRF using the determined position and rotation of the transmitter in the GRF.

Another embodiment discloses a system for determining position and orientation of a transmitter, and by extension position and orientation of a receiver, in an electromagnetic (EM) tracking system comprising: a head mounted display (HMD) having a head tracking technology; the transmitter comprising a plurality of source magnetic coils each configured to generate a magnetic field and a transmitter inertial measurement unit (IMU); the receiver comprising a plurality of sensor magnetic coils configured to sense the magnetic fields; and, a processor configured to: determine a rotation of the HMD relative to a Global Reference Frame (GRF) using the HMD head tracking technology; determine the rotation of the HMD relative to a Local Reference Frame (LRF) using the EM tracking system; determine a rotation of the transmitter relative to an Inertial Reference Frame (IRF) using the transmitter IMU; determine an unfiltered rotation of the transmitter relative to the GRF; determine an unfiltered rotation of the IRF relative to the GRF; determine a drift comprising a low-pass filtering of the unfiltered rotation of the IRF relative to the GRF; determine a rotation of the transmitter using the drift and the rotation of the transmitter relative to the IRF; determine the position of the HMD relative to the GRF; determine a position of the HMD relative to the LRF using the EM tracking system; determine a position of the transmitter relative to the GRF using the determined rotation of the HMD relative to the GRF, the determined rotation of the transmitter, and the determined position of the transmitter relative to the LRF; and determine a position and rotation of the receiver in the GRF using the determined position and rotation of the transmitter in the GRF.

Still another embodiment discloses a non-transitory computer-readable storage medium having embodied thereon instructions for causing a computing device to execute a method of determining position and orientation of a transmitter, and by extension position and orientation of a receiver, in an electromagnetic (EM) tracking system comprising a head mounted display (HMD) having a head tracking technology, the transmitter comprising a plurality of source magnetic coils each configured to generate a magnetic field and a transmitter inertial measurement unit (IMU), and the receiver comprising a plurality of sensor magnetic coils configured to sense the magnetic fields, the method comprising: determining a rotation of the HMD relative to a Global Reference Frame (GRF) using the HMD head tracking technology; determining the rotation of the HMD relative to a Local Reference Frame (LRF) using the EM tracking system; determining a rotation of the transmitter relative to an Inertial Reference Frame (IRF) using the transmitter IMU; determining an unfiltered rotation of the transmitter relative to the GRF; determining an unfiltered rotation of the IRF relative to the GRF; determining a drift comprising a low-pass filtering of the unfiltered rotation of the IRF relative to the GRF; determining a rotation of the transmitter using the drift and the rotation of the transmitter relative to the IRF; determining the position of the HMD relative to the GRF; determining a position of the HMD relative to the LRF using the EM tracking system; determining a position of the transmitter relative to the GRF using the determined rotation of the HMD relative to the GRF, the determined rotation of the transmitter, and the determined position of the transmitter relative to the LRF; and determining a position and rotation of the receiver in the GRF using the determined position and rotation of the transmitter in the GRF.

BRIEF DESCRIPTION OF THE DRAWINGS

FIG. 4 shows rotation of the Head Mounted Display relative to the Global Reference Frame according to one embodiment of the present invention.

FIG. 5 shows rotation of the Head Mounted Display relative to the Local Reference Frame according to one embodiment of the present invention.

FIG. 6 shows the Inertial Reference Frame according to one embodiment of the present invention.

FIG. 7 shows rotation of the Head Mounted Display relative to the Global Reference Frame, rotation of the transmitter relative to the Global Reference Frame and also drift according to one embodiment of the present invention.

DETAILED DESCRIPTION OF THE INVENTION

Figure 1:
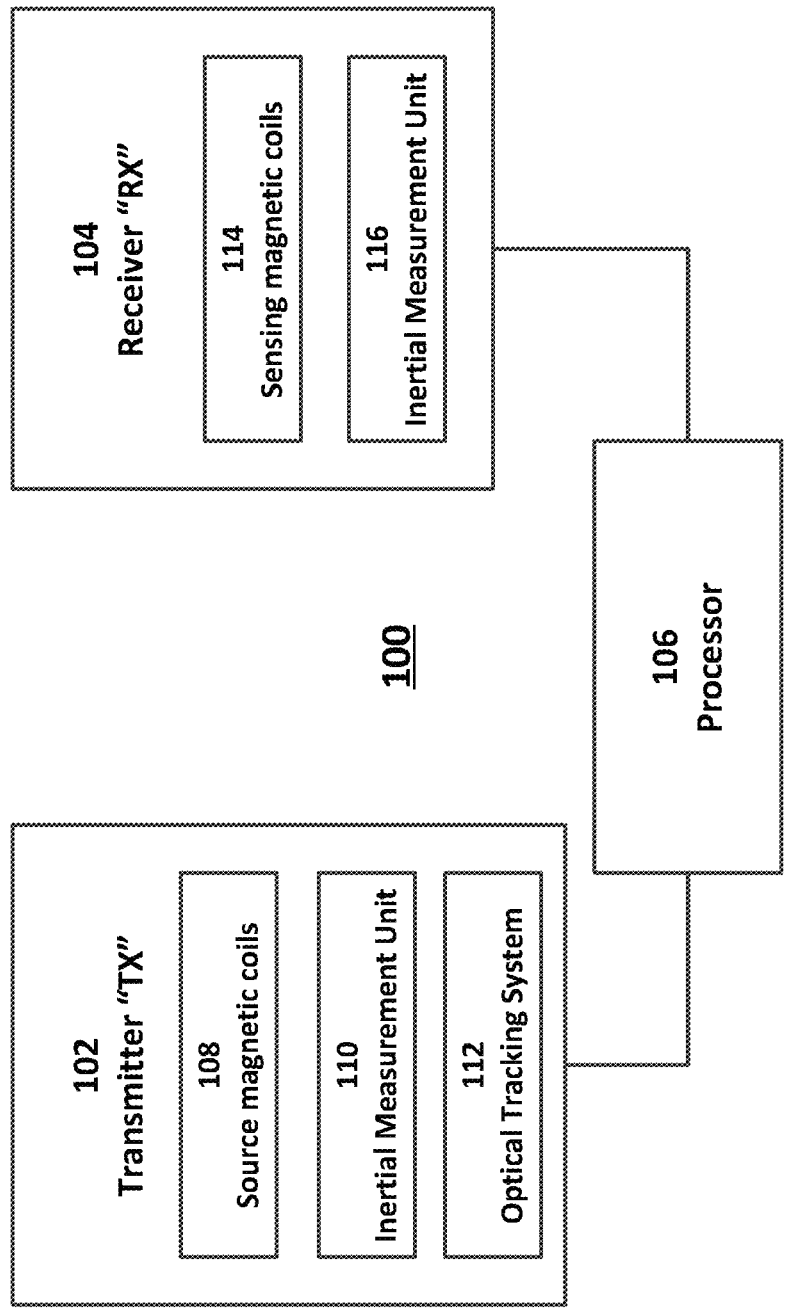
FIG. 1 is a block diagram of one embodiment of a system for determining pose of a transmitter, and by extension the pose of one or more receivers, in an electromagnetic tracking system when the transmitter is allowed to move freely in the physical environment according to one embodiment of the present invention.

A method and apparatus is disclosed for determining pose of a transmitter, and by extension the pose of one or more sensors, in an electromagnetic tracking system when the transmitter is allowed to move freely in the physical environment. The method operates in a system that incorporates two separate tracking technologies: one technology determining the pose of a device relative to a global reference frame (i.e., producing a tracking pose relative to the physical environment which the user is in); and another technology determining the pose of the same device relative to a local reference frame (i.e., producing a tracking pose relative to the transmitter). The present approach avoids the latency problem and resulting inaccuracy of pose determinations of the known prior approach.

As is known in the art, in a system with two separate tracking technologies, it is possible to determine the pose of at least one of the receivers in both a local reference frame and a global reference frame. With this information, the transmitter can then be located in the global reference frame. Locating the transmitter in the global reference frame also means that any other receivers can then be located in the global reference frame. However, this known prior approach is very sensitive to time delays or time discrepancies (referred to herein as latency) between when the pose of the at least one receiver in the local reference frame is determined and when the pose of the at least one receiver in the global reference frame is determined. As explained further elsewhere herein, this latency has the effect of the local reference frame being inaccurately oriented in the global reference frame and therefore all receivers will have an inaccurate displayed image in the HMD.

One known prior solution to this latency problem is to locate the transmitter on the same device with the external tracking technology (e.g., placing the electromagnetic transmitter coils on the same HMD as, e.g., an optical tracking technology) thereby directly inferring the pose of the transmitter in the global reference frame. However, placing the transmitter on the HMD that already houses the external tracking technology adds cost and weight to the HMD and consumes additional power, all of which are generally undesirable. Further, having the transmitter attached to the HMD makes tracking more distant objects (e.g., sensors located on a user's lower extremities such as knees and ankles) more difficult and less accurate.

Another known prior solution to this latency problem is to place the transmitter stationary relative to the physical environment (e.g., in a base station to be placed on a table). This makes the local reference frame have a constant static relationship with the global reference frame and is therefore always accurate. However, while effective, this prior approach makes the system less portable and restricts movement of the user to being within range of the stationary transmitter.

The present approach, by contrast, addresses this latency problem by leveraging an Inertial Measurement Unit (IMU) located on the transmitter to more accurately orient and locate the transmitter in the room without the need for the transmitter to be directly tracked, placed stationary, or inferred from the orientation of the HMD. The orientation of the transmitter is found via its own IMU, which by the nature of IMUs is expressed as relative to a static reference frame with a (mostly) constant relationship to the global reference frame of the HMD, and thus the local reference frame's pose can be placed in the global reference frame more directly without depending on the problematic receiver measurements and resulting latency. This makes the local reference frame pose determination more accurate, therefore making all global receiver pose determinations more accurate as well.

Before explaining further how the present approach works, it may be helpful to explain the system components first and the known prior approach to solving the problem.

Referring now to FIG. 1 is a block diagram of one embodiment of a system for determining pose of a transmitter, and by extension the pose of one or more sensors, in an electromagnetic tracking system when the transmitter is allowed to move freely in the physical environment.

System 100 contains a transmitter "TX" 102 (otherwise known as an emitter), a receiver "RX" 104 (otherwise known as a sensor) and a processor 106. In some embodiments of the present approach, transmitter 102 and receiver 104 are separately attached to some movable object or person. Further, transmitter 102 contains source magnetic coils 108 for generating magnetic fields, while receiver 104 contains sensing magnetic coils 112 for sensing the magnetic fields. In the present embodiment, transmitter 102 also includes another tracking technology, e.g., optical tracking system 112, for determining the pose of transmitter 102 relative to the physical environment.

Also in the present embodiment, transmitter 102 and receiver 104 each contain an IMU 110 and 114, respectively, although in alternative embodiments of system 100 IMU 114 may not be included with receiver 104. As is known in the art, an IMU is an electronic device that is commonly used to measure and report the velocity, orientation and gravitational forces on a device or craft, using a combination of accelerometers and gyroscopes, and sometimes even magnetometers.

System 100 also contains processor 106, which generates a SigMat as described herein and known in the art from the data it receives from transmitter 102 and receiver 104, and then generates a position and orientation of the receiver. It is to be understood that processor 106 may be located physically separate from both transmitter 102 and receiver 104 or may be physically combined with either one of transmitter 102 or receiver 104.

Figure 2:
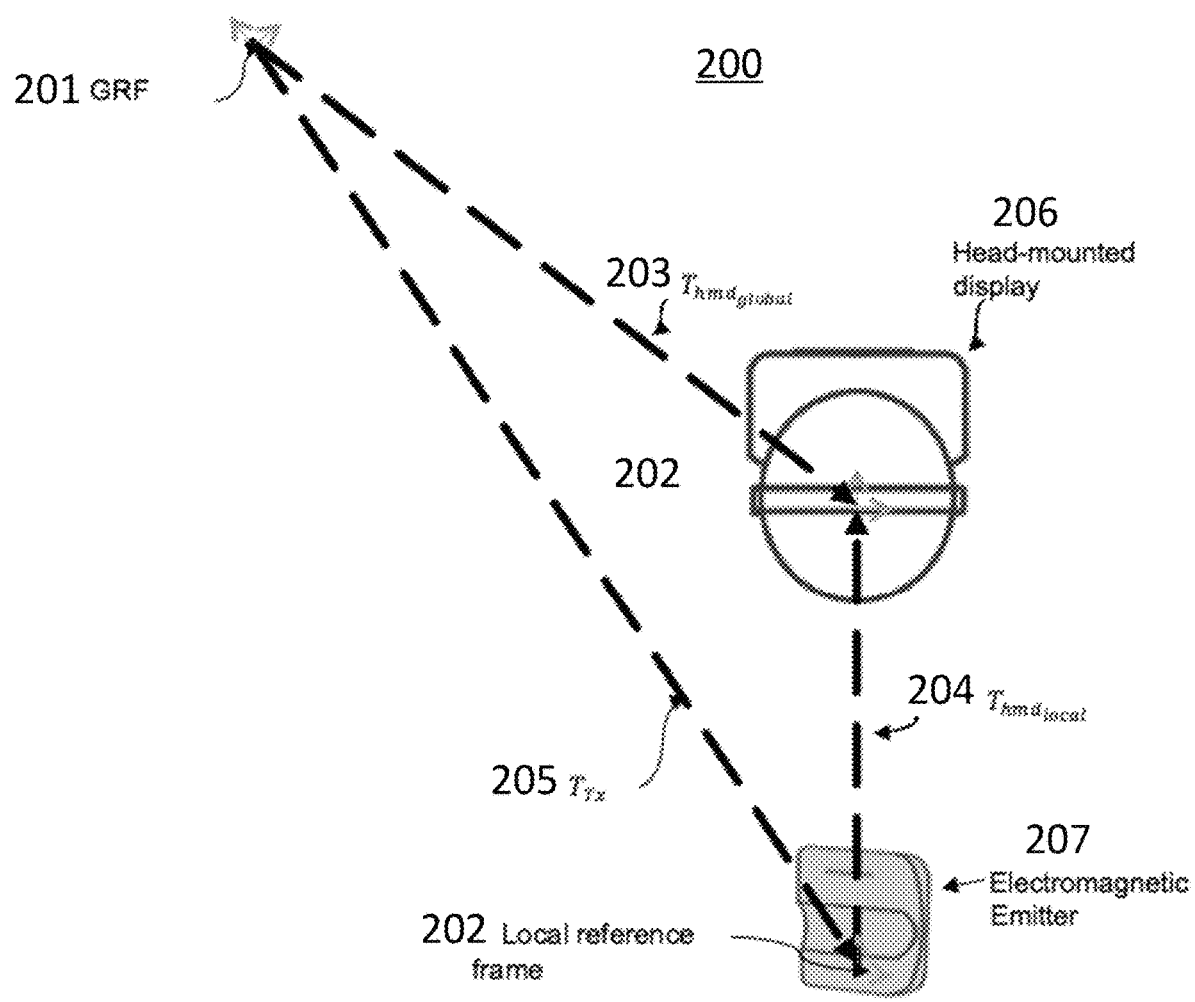
FIG. 2 is one example of a known prior approach of determining pose of a transmitter in both a local reference frame and a global reference frame.

Referring now to FIG. 2, one example of a known prior approach is shown. In this example, the following terminology is shown and used:

Global Reference Frame (GRF) 201—A reference frame defined by a set of axes and origin point that is aligned and stationary with the static environment (e.g., the room or the ground in which the system is being operated). This GRF 201 is the reference in which the pose (position and orientation) of the HMD 206 is measured against when using the other tracking technology (e.g., the optical tracking technology).

Local Reference Frame (LRF) 202—A reference frame formed by the coils of the electromagnetic emitter 207. Emitter 207 is free to move about in space (e.g., in the room in which the system is being operated) but is not necessarily tracked by the same other tracking technology (e.g., the optical tracking technology) used to track the HMD 206.

Pose 203 of HMD 206 relative to GRF 201—Referred to herein as $T_{hmdglobal}$ this is the pose of the HMD 206 relative to the GRF 201. It is obtained through an Application Programming Interface (API) for the head tracking technology provided by the HMD's other tracking technology (e.g., the optical tracking technology). It is typically used in this known approach as a 4×4 transformation matrix.

Pose 204 of HMD 206 relative to LRF 202—Referred to herein as $T_{hmdlocal}$ this is the pose of the HMD 206 relative to the LRF 202. Since the HMD 206 is equipped with an electromagnetic sensor (the receiver Rx), $T_{hmdlocal}$ may be obtained through an API for the electromagnetic tracking system. It is typically used in this known approach as a 4×4 transformation matrix.

Pose 205 of the electromagnetic emitter 207 relative to the GRF 201—Referred to herein $T_{Tx}$ this is the pose of the transmitter Tx (i.e., emitter 207) relative to the GRF 201. It is typically used in this known approach as a 4×4 transformation matrix.

With this terminology now defined, the known prior approach for finding the LRF 202 pose $T_{Tx}$ at each time update (each time update being known in the art as a "sample" or "frame") is performed according to the following steps:

1) Obtain $T_{hmdglobal}$ from the (e.g., optical) HMD tracking system API.
2) Obtain $T_{hmdlocal}$ from the electromagnetic (EM) tracking system API.
3) Perform the following calculation:

$$T_{Tx} = T_{hmdglobal} * T_{hmdlocal}^{-1} \quad \text{(Formula 1)}$$

Because $T_{Tx}$ defines the relationship of the local reference frame (i.e., LRF 202) to the global reference frame (i.e., GRF 201), $T_{Tx}$ can be used to find the global reference frame pose of any receiver operating within the system by multiplying the receiver's local reference frame pose as shown below:

$$R_{global} = T_{Tx} * R_{local} \quad \text{(Formula 2)}$$

However, because the samples of $T_{hmdglobal}$ and $T_{hmdlocal}$ come from two separate tracking system APIs, there is no way to ensure that they were sampled at the exact same point in time. Therefore, using Formula 1 above, any such time discrepancy between the two sample measurements will be present in the formulation of $T_{Tx}$. This discrepancy thus introduces the latency problem that was described above and is solved by the present approach.

This latency problem of the known prior approach can be seen by the user wearing the HMD when they move their head and there are time differences between the sampling of $T_{hmdlocal}$ and $T_{hmdglobal}$. Because the HMD is moving, it can be in a different orientation in space at the different sampling times. This causes the two measurements to diverge in space, and the resulting determination of the transmitter position ($T_{Tx}$) will diverge as well, as shown and described with reference to FIG. 3. Further, because the various electromagnetic sensor poses (i.e., the various receivers operating within the system) are measured or determined based on the determined transmitter position ($T_{Tx}$), all of those poses will also diverge from reality as well. This causes the displayed images of the sensors in the HMD (e.g., the user's hands, feet, etc.) to "drag" behind their actual physical positions as the user wearing the HMD rotates their head.

Figure 3:
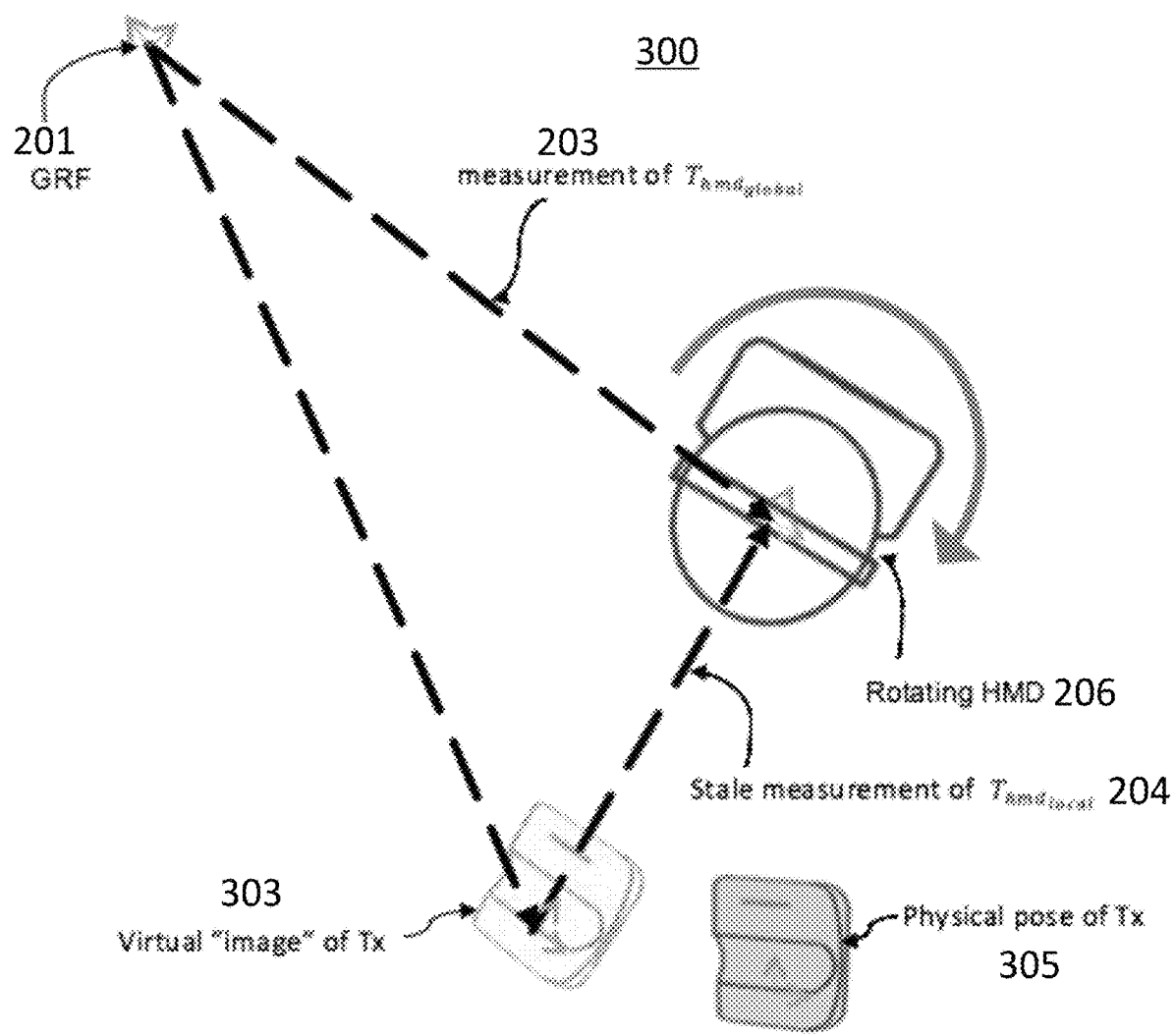
FIG. 3 is an example of the latency problem of the known prior approach.
Figure 8:
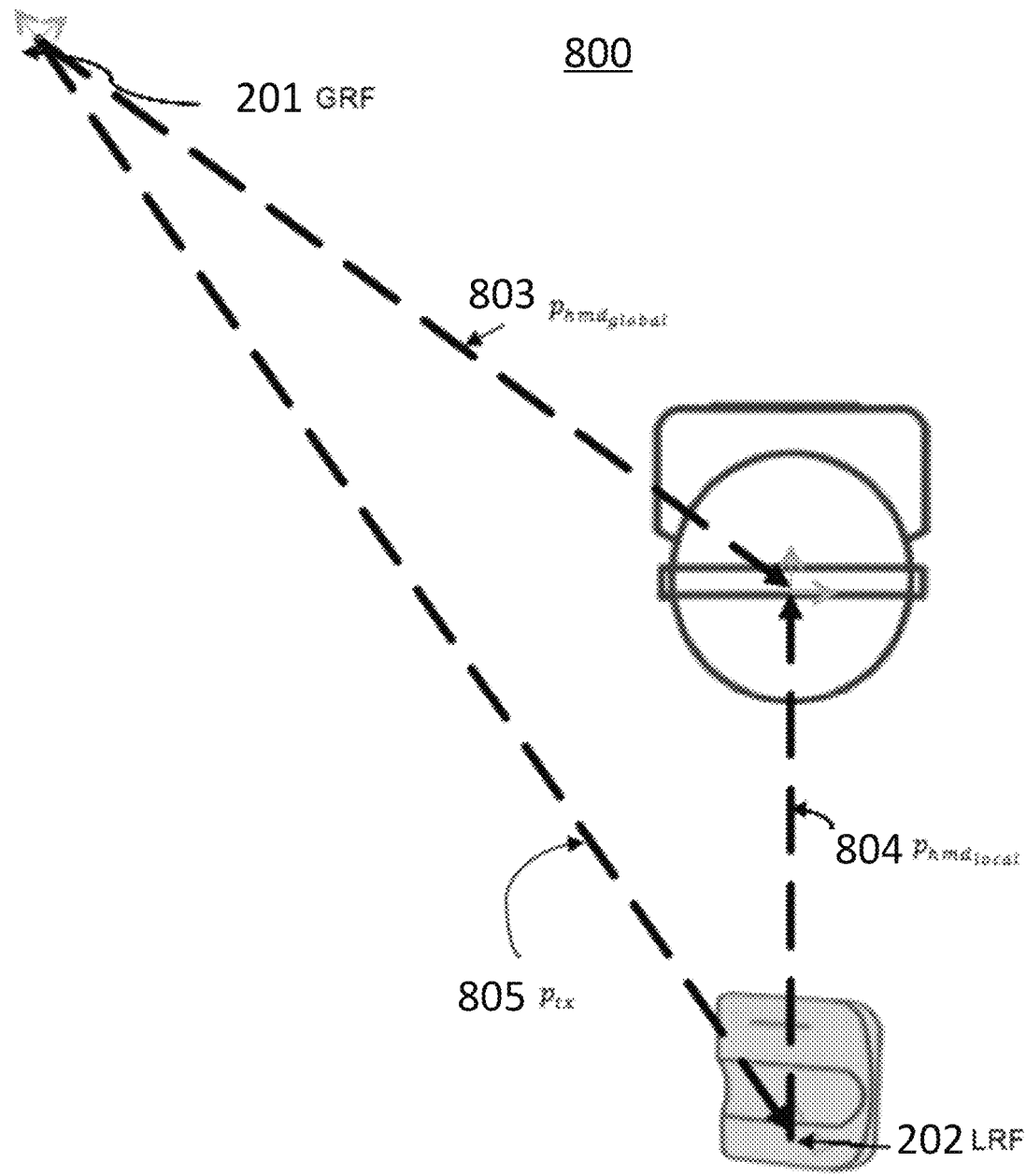
FIG. 8 shows position of the Head Mounted Display relative to the Global Reference Frame according to one embodiment of the present invention.

Referring now to FIG. 3, an example of this effect according to the known prior approach can be seen. This example demonstrates what happens when the HMD 206 is rotated, but the electromagnetic emitter (transmitter Tx) remains stationary. The stale measurement of the HMD pose relative to the Tx local reference frame comes from an earlier point in time when the HMD was oriented as was shown in FIG. 2. That stale measurement results in step 3 (see Formula 1 above) of the known prior approach determining the transmitter Tx to be oriented differently and positioned off to the left from where it should be. This is shown in the figure where the "Rotating HMD," the "measurement of $T_{hmdglobal}$" and the "Stale measurement of $T_{hmdlocal}$" results in the display of "Virtual 'image' of Tx 303" rather than the correct "Physical pose of Tx 305."

Further, as explained above, this latency problem also results in an incorrect display of the various sensors operating within the system because they, too, rely on $T_{Tx}$ defining the relationship of the local reference frame to the global reference frame (as used in Formula 2 above).

The present approach avoids this latency problem by, instead, providing an IMU-enabled solution. While this new approach is similar the known prior approach in some ways, it reduces the moment-to-moment dependence on the orientation of the HMD to near zero. Instead, the orientation component of the pose of the electromagnetic emitter (transmitter Tx) is determined primarily via an IMU on the electromagnetic emitter as explained further herein.

The present approach of finding $T_{Tx}$ is subdivided into two smaller tasks:

1) Find the rotation (also known as and referred to herein as orientation) of the electromagnetic emitter (i.e., transmitter Tx) relative to the GRF. In one embodiment, this is done by determining the rotation component of $T_{Tx}$ referred to herein as $R_{Tx}$ (in one embodiment, a 3×3 rotation matrix) through a process shown and described below.
2) Find the position of the electromagnetic emitter (i.e., transmitter Tx) relative to the GRF. In one embodiment, this is done by determining the position component of $T_{Tx}$ referred to herein as $P_{Tx}$ (in one embodiment, a 3×1 column vector) through a process shown and described below.

Finding $R_{Tx}$ by Example:

With respect to the first of the two smaller tasks according to the present approach, that is, finding the rotation component of $T_{Tx}$, referred to herein as $R_{Tx}$, will now be shown and described by example. Referring now to FIGS. 4 through 7, the following terminology is shown and used:

Global Reference Frame (GRF) 201 (see FIGS. 4 and 7)—A global reference frame defined by a set of axes and origin point that is aligned and stationary with the static environment (e.g., the room or the ground in which the system is being operated). This GRF is the reference in which the pose (position and orientation) of the HMD is measured against when using the other tracking technology (e.g., the optical tracking technology). This is the same reference frame used and described above in the known prior solution.

HMD rotation relative to GRF 402 (see FIGS. 4 and 7)—Referred to herein as $R_{hmdglobal}$, this is the rotation of the HMD relative to the GRF. In one embodiment, $R_{hmdglobal}$ is obtained through an API for the head tracking technology provided by the HMD's other tracking technology (e.g., the optical tracking technology). In one embodiment, it is used here as a 3×3 rotation matrix.

Local Reference Frame (LRF) 202 (see FIG. 5)—The local reference frame formed by the coils of the electromagnetic emitter (i.e., transmitter Tx). Transmitter Tx is free to move about in space (e.g., in the room in which the system is being operated) but is not necessarily tracked by the same other tracking technology (e.g., the optical tracking technology) used to track the HMD. This is the same reference frame used and described above in the known prior solution.

Rotation of HMD relative to LRF 504—(See FIG. 5) Referred to herein as $R_{hmdlocal}$ this is the rotation of the HMD relative to the LRF. Since the HMD is equipped with an electromagnetic sensor (the receiver Rx), $R_{hmdlocal}$ may be obtained through an API for the electromagnetic tracking system. In one embodiment, it is used here as a 3×3 rotation matrix.

Inertial Reference Frame (IRF) 605 (see FIG. 6)—An inertial reference frame from which the orientation of the IMU in the transmitter Tx is measured. The IRF is stationary with respect to the world and does not rotate. However, due to compounding errors in the IMU, the IRF tends to slowly drift over time, which drift is addressed in one embodiment as explained further below.

IMU Rotation 606 (see FIG. 6)—Referred to $R_{Tximu}$. The IMU attached to the transmitter TX can measure the transmitter Tx's rotation relative to the IRF. In one embodiment, this rotation is expressed as a 3×3 rotation matrix.

Unfiltered rotation of transmitter Tx relative to GRF 707 (see FIG. 7)—Referred to herein as $R_{Txglobal}$, this rotation is defined by the following product, which is mathematically the same rotation as in the known prior approach and described above (see Formula 2):

$$R_{Txglobal}=R_{hmdglobal}*R_{hmdlocal}^{-1} \quad \text{(Formula 3)}$$

Unfiltered rotation of the IRF relative to the GRF 708 (see FIG. 7)—Referred to herein as $R_{drift}$, this rotation represents the instantaneous rotation measurement of the IMU IRF relative to the GRF. In one embodiment, $R_{drift}$ is found by the following product:

$$R_{drift}=R_{Txglobal}*R_{TxIMU}^{-1} \quad \text{(Formula 4)}$$

This is in effect a measurement of the rotational offset or "drift" between the IMU's IRF 605 and the HMD's GRF 201. This measurement is subject to the same latency error that $T_{Tx}$ had in the known prior approach, however the latency error in the present approach is very transient and only evident during rapid movements of the HMD, whereas actual gyroscope accumulative drift error is very slow and only evident over long periods of time. This therefore allows using a low-pass filter to remove the transient in the present approach, as described further below.

Figure 9:
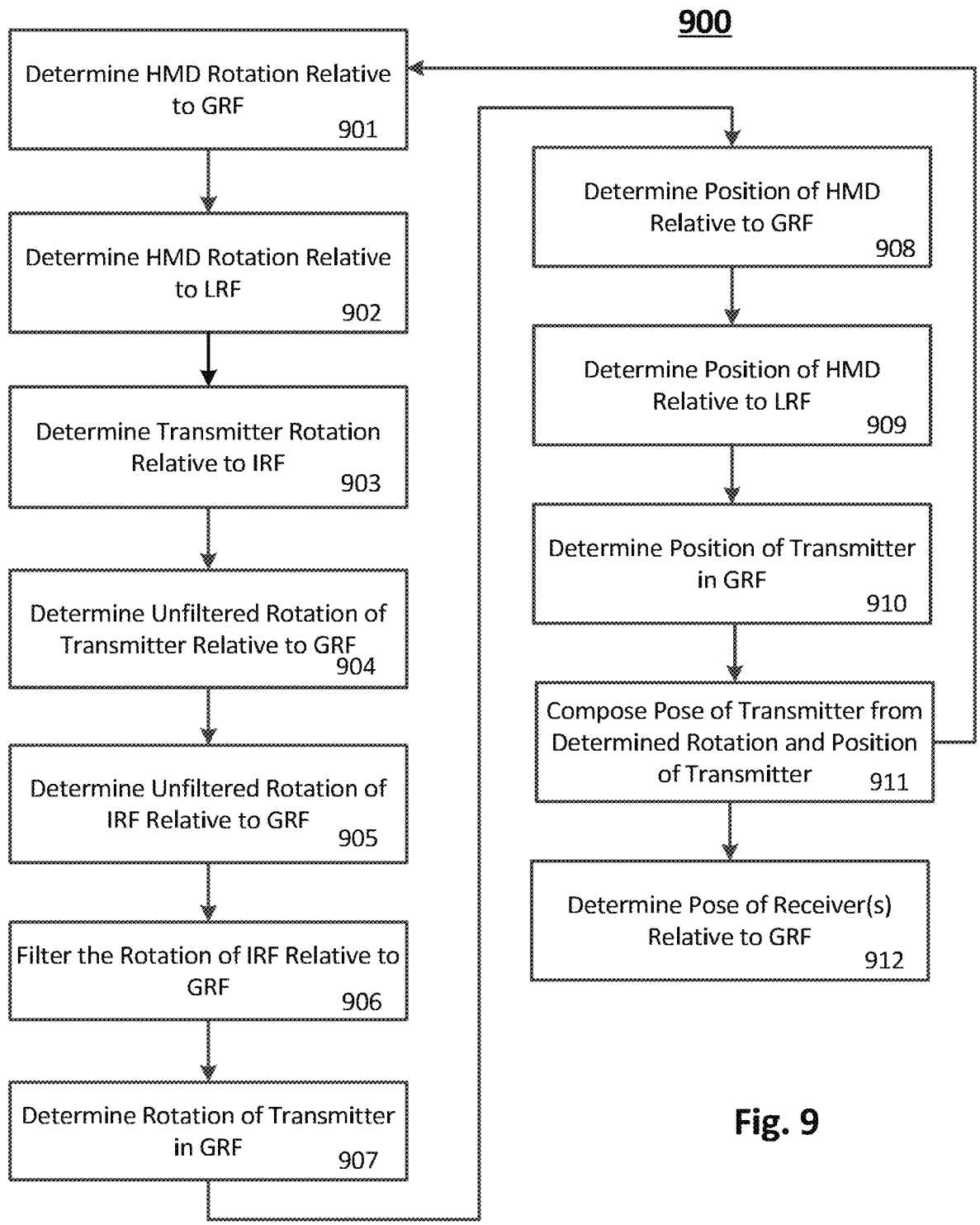
FIG. 9 is a flowchart of one embodiment of a method to determine pose of a transmitter, and by extension the pose of one or more receivers, in an electromagnetic tracking system when the transmitter is allowed to move freely in the physical environment according to one embodiment of the present invention.

With this terminology now defined, and referring now to FIG. 9, the present approach for finding $R_{Tx}$ at each time update is performed in one embodiment according to the following steps:

In step 901, the rotation of the HMD relative to the GRF, referred to herein as $R_{HMDGLOBAL}$, is determined by accessing an API for the head tracking technology (e.g., the optical tracking system). As stated above, in one embodiment this is a 3×3 transformation matrix.

In step 902, the rotation of the HMD relative to the LRF, referred to herein as $R_{HMDLOCAL}$, is determined by accessing an API for the EM tracking system. As stated above, in one embodiment this is a 3×3 transformation matrix.

In step 903, the rotation of the transmitter relative to the IRF, referred to herein as $R_{TXIMU}$, is determined by accessing an API for the EM tracking system. In one embodiment, this is provided by an IMU orientation filter such as Mahoney or Madgwick (as would be understood by one of skill in the art in light of the teachings herein) that processes acceleration and gyroscope measurements and produces a rotation relative to the IRF. Due to the physical mounting arrangement of the IMU relative to the coil, as would be understood by one of skill in the art in light of the teachings herein, it may be necessary to correct for this offset in the measurement of $R_{TxIMU}$ so that it describes the rotation of the coil instead of the rotation of the IMU.

In step 904, an unfiltered rotation of the transmitter relative to the GRF, referred to herein as $R_{TXGLOBAL}$, is determined according to the following calculation:

$$R_{Txglobal}=R_{hmdglobal}*R_{hmdlocal}^{-1} \quad \text{(Formula 5)}$$

In step 905, an unfiltered rotation of the IRF relative to the GRF, referred to herein as $R_{drift}$, is determined according to the following calculation:

$$R_{drift}=R_{Txglobal}*R_{TxIMU}^{-1} \quad \text{(Formula 6)}$$

In step 906, a low-pass filtering of $R_{drift}$ is performed according to the following calculation:
a. for the initial update:

$$R\text{drift}[0]=R\text{drift for the initial update} \quad \text{(Formula 7)}$$

b. for subsequent update(s):

$$R\text{drift}[n]=\text{slerp}(R\text{drift}[n-1],R\text{drift},\alpha) \quad \text{(Formula 8)}$$

It is to be understood that this is analogous to a first-order digital Infinite Impulse Response (IIR) filter but with the caveat that while typical filters operate on and interpolate between 1-dimensional samples, this filter operates on and interpolates between rotations. In one embodiment, a very slow rate of change is desired, so a very small α of 0.001 is used to ensure transient effects of $R_{drift}$ are imperceptible yet still present enough to account for the actual gyroscope drift.

It is to be noted here that slerp( ) is a well-known function for spherical linear interpolation. It linearly interpolates between two given rotations by an interpolating factor α.

In step 907, the rotation of the transmitter, referred to herein as $R_{Tx}$ and in one embodiment a 3×3 rotation matrix, is determined by performing the following calculation, which in effect brings the IMU rotation $R_{TxIMU}$ into the GRF by correcting for the IMU drift:

$$R_{Tx}=R_{drift}[n]*R_{TxIMU} \quad \text{(Formula 9)}$$

Finding $P_{Tx}$ by Example:

Likewise, with respect to the second of the two smaller tasks according to the present approach, that is, finding the position of $T_{Tx}$, referred to herein as $P_{Tx}$, will now be shown and described by example. Referring now to FIGS. 4 through 8, the following terminology is shown and used:

Global Reference Frame (GRF) 201—same as described above with reference to FIGS. 4 through 7.

Local Reference Frame (LRF) 202—same as described above with reference to FIG. 7.

Position of HMD relative to GRF 803 (see FIG. 8)—Referred to herein as $P_{HMDglobal}$, this is the position of the HMD relative to the GRF. In one embodiment, this is obtained through an API for the head tracking technology provided by the HMD's other tracking technology (e.g., the optical tracking technology). In one embodiment, it is used here as a 3×1 column vector.

Position of HMD relative to LRF 804 (see FIG. 8)—Referred to herein as $P_{HMDlocal}$, this is the position of the HMD relative to the LRF. Since the HMD is equipped with an electromagnetic sensor (e.g., a receiver Rx), in one embodiment $P_{HMDlocal}$ may be obtained through an API for electromagnetic tracking. In one embodiment, it is used here as a 3×1 column vector.

Position of EM emitter relative to GRF 805 (see FIG. 8)—Referred to herein as $P_{Tx}$, this is the position of the transmitter Tx relative to the GRF. In one embodiment, it is used here as a 3×1 column vector.

With this terminology now defined, and referring again to FIG. 9, the present approach for finding $P_{Tx}$ at each time update is performed in one embodiment according to the following steps:

In step 908, the position of the HMD relative to the GRF, referred to herein as $P_{HMDglobal}$, is determined by accessing an API for the head tracking technology (e.g., the optical tracking system). As stated above, in one embodiment this is a 3×1 column vector.

In step 909, the position of the HMD relative to the LRF, referred to herein as $P_{HMDglobal}$, is determined by accessing an API for the EM tracking system. As stated above, in one embodiment this is a 3×1 column vector.

In step 910, the position of the transmitter in the GRF, referred to herein as $P_{Tx}$, is determined, using $R_{Tx}$, determined as described above in steps 901-907, according to the following calculation (in one embodiment resulting in, as stated above, a 3×1 column vector):

$$P_{Tx} = P_{HMDglobal} - R_{Tx} * P_{HMDlocal} \quad \text{(Formula 10)}$$

In step 911, having now determined both the rotation of the transmitter in the GRF ($R_{Tx}$) and the position of the transmitter in the GRF ($P_{Tx}$), the pose of the transmitter, referred to herein as $T_{Tx}$, is composed from each of $R_{Tx}$ and $P_{Tx}$ as rotation and position respectively. As stated above, in one embodiment this is a 4×4 transformation matrix.

Further, having now composed $T_{Tx}$ according to this new approach provides a transformation that can also be used to place other sensors (receivers Rx) relative to the virtual world. Thus, in step 912, a pose of a receiver relative to the GRF (referred to herein as $R_{global}$) is determined according to Formula 2 described above.

It is to be noted that composing the electromagnetic emitter (transmitter) pose $T_{Tx}$ within the global reference frame is done almost entirely from the IMU rotation and is therefore not affected by the motion of the HMD or any other point of reference. In this way, the latency error between the measurements of the HMD position in both local and global reference frames have vastly reduced effects on the error of electromagnetic emitter (transmitter) pose $T_{Tx}$. With this improvement, the other EM devices (e.g., other receiver(s) Rx) are able to be located in the global reference space accurately as well, and the negative effects of latency are so small as to be essentially imperceptible.

Further, it is to be understood that the above-described process is then repeated at each subsequent time update as shown in the figure by the process returning to step 901 after step 911.

Additional embodiments to those mentioned above are described below. In some embodiments, the IMU, HMD, transmitter, and sensors together form a system. The system may an augmented reality system, mixed reality system, or virtual reality system.

In some embodiments, the HMD is a virtual reality headset that is worn by a user. The transmitter or the sensors may be positioned on the user, such as on the user's hands or feet. In other embodiments, the transmitter or the sensors may be positioned on an object, such as a stationary object or an object that relates to a video game.

In some embodiments, the IMU may include an accelerometer and/or a gyroscope. The gyroscope and the accelerometer may be used to determine the orientation of the transmitter with respect to a gravity vector. An orientation filter may be used to determine a displacement of the transmitter with respect to an axis that is perpendicular to the gravity vector.

The disclosed system and method have been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above. It will also be apparent that in some instances the order of steps described herein may be altered without changing the result of performance of all of the described steps.

There may be a single processor, or multiple processors performing different functions of the functions described herein. One of skill in the art will appreciate how to determine which and how many processors will be appropriate for a specific intended application, and where in a given system, they might be located.

It is to be understood in light of the teachings herein that the poses (positions and orientations) expressed in the above described and shown formulas are expressed as 4×4 and 3×3 matrices respectively. However, 3×4 matrices or quaternions are also used to express transformations and rotations respectively and it is known in the art to adapt such formulas for such representations, which can thus also be used according to the present approach.

It should also be appreciated that the described method and apparatus can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc. It may be possible to incorporate the described methods into hard-wired logic if desired. It should be noted that the order of the steps of the methods described herein may be altered and still be within the scope of the disclosure.

It is to be further understood in light of the teachings herein that while tracking technologies such as "optical," "inside-out," and "electromagnetic" are referred to herein, the present approach is not limited to using these particular technologies. Thus, in a further embodiment, the present approach can likewise be achieved using any two tracking systems that can provide both position and orientation of objects, with at least one of those objects being tracked by both.

Further, the above-described filtering used with $R_{draft}$ is expressed here as a first-order IIT filter analogue. However, it is to be understood in light of the teachings herein that any low-pass (LP) filtering technique can be used in the present approach.

These and other variations upon the embodiments are intended to be covered by the present disclosure, which is limited only by the appended claims.

What is claimed is:

1. A method of determining position and orientation of a transmitter, and by extension position and orientation of a receiver, in an electromagnetic (EM) tracking system comprising a head mounted display (HMD) having a head tracking technology, the transmitter comprising a plurality of source magnetic coils each configured to generate a magnetic field and a transmitter inertial measurement unit (IMU), and the receiver comprising a plurality of sensor magnetic coils configured to sense the magnetic fields, the method comprising:

determining, by a processor, a rotation of the HMD relative to a Global Reference Frame (GRF) using the HMD head tracking technology;

determining, by the processor, the rotation of the HMD relative to a Local Reference Frame (LRF) using the EM tracking system;

determining, by the processor, a rotation of the transmitter relative to an Inertial Reference Frame (IRF) using the transmitter IMU;

determining, by the processor, an unfiltered rotation of the transmitter relative to the GRF;

determining, by the processor, an unfiltered rotation of the IRF relative to the GRF;

determining, by the processor, a drift comprising a low-pass filtering of the unfiltered rotation of the IRF relative to the GRF;
determining, by the processor, a rotation of the transmitter using the drift and the rotation of the transmitter relative to the IRF;
determining, by the processor, the position of the HMD relative to the GRF;
determining, by the processor, a position of the HMD relative to the LRF using the EM tracking system;
determining, by the processor, a position of the transmitter relative to the GRF using the determined rotation of the HMD relative to the GRF, the determined rotation of the transmitter, and the determined position of the transmitter relative to the LRF; and
determining, by the processor, a position and rotation of the receiver in the GRF using the determined position and rotation of the transmitter in the GRF.

2. The method of claim 1 further comprising:
determining, by a processor, a position and rotation of another receiver in the GRF using the determined position and rotation of the transmitter in the GRF.

3. The method of claim 1 wherein determining the rotation of the HMD relative to the GRF using the HMD head tracking technology generates a 3×3 transformation matrix.

4. The method of claim 1 wherein determining the rotation of the HMD relative to the LRF using the EM tracking system generates a 3×3 transformation matrix.

5. The method of claim 1 wherein determining the rotation of the transmitter relative to the IRF using the transmitter IMU is performed using an IMU orientation filter.

6. The method of claim 1 wherein determining the drift comprising a low-pass filtering of the unfiltered rotation of the IRF relative to the GRF is performed using a first-order Infinite Impulse Response (IIR) that operates on and interpolates between rotations.

7. The method of claim 1 wherein determining the position of the HMD relative to GRF generates a 3×1 column vector.

8. The method of claim 1 wherein determining the position of the HMD relative to LRF using the EM tracking system generates a 3×1 column vector.

9. Repeating method of claim 1 for a subsequent time update.

10. A system for determining position and orientation of a transmitter, and by extension position and orientation of a receiver, in an electromagnetic (EM) tracking system comprising:
a head mounted display (HMD) having a head tracking technology;
the transmitter comprising a plurality of source magnetic coils each configured to generate a magnetic field and a transmitter inertial measurement unit (IMU);
the receiver comprising a plurality of sensor magnetic coils configured to sense the magnetic fields; and,
a processor configured to:
determine a rotation of the HMD relative to a Global Reference Frame (GRF) using the HMD head tracking technology;
determine the rotation of the HMD relative to a Local Reference Frame (LRF) using the EM tracking system;
determine a rotation of the transmitter relative to an Inertial Reference Frame (IRF) using the transmitter IMU;
determine an unfiltered rotation of the transmitter relative to the GRF;
determine an unfiltered rotation of the IRF relative to the GRF;
determine a drift comprising a low-pass filtering of the unfiltered rotation of the IRF relative to the GRF;
determine a rotation of the transmitter using the drift and the rotation of the transmitter relative to the IRF;
determine the position of the HMD relative to the GRF;
determine a position of the HMD relative to the LRF using the EM tracking system;
determine a position of the transmitter relative to the GRF using the determined rotation of the HMD relative to the GRF, the determined rotation of the transmitter, and the determined position of the transmitter relative to the LRF; and
determine a position and rotation of the receiver in the GRF using the determined position and rotation of the transmitter in the GRF.

11. The system of claim 10 wherein the processor is further configured to:
determine a position and rotation of another receiver in the GRF using the determined position and rotation of the transmitter in the GRF.

12. A non-transitory computer readable storage medium having embodied thereon instructions for causing a computing device to execute a method of determining position and orientation of a transmitter, and by extension position and orientation of a receiver, in an electromagnetic (EM) tracking system comprising a head mounted display (HMD) having a head tracking technology, the transmitter comprising a plurality of source magnetic coils each configured to generate a magnetic field and a transmitter inertial measurement unit (IMU), and the receiver comprising a plurality of sensor magnetic coils configured to sense the magnetic fields, the method comprising:
determining a rotation of the HMD relative to a Global Reference Frame (GRF) using the HMD head tracking technology;
determining the rotation of the HMD relative to a Local Reference Frame (LRF) using the EM tracking system;
determining a rotation of the transmitter relative to an Inertial Reference Frame (IRF) using the transmitter IMU;
determining an unfiltered rotation of the transmitter relative to the GRF;
determining an unfiltered rotation of the IRF relative to the GRF;
determining a drift comprising a low-pass filtering of the unfiltered rotation of the IRF relative to the GRF;
determining a rotation of the transmitter using the drift and the rotation of the transmitter relative to the IRF;
determining the position of the HMD relative to the GRF;
determining a position of the HMD relative to the LRF using the EM tracking system;
determining a position of the transmitter relative to the GRF using the determined rotation of the HMD relative to the GRF, the determined rotation of the transmitter, and the determined position of the transmitter relative to the LRF; and
determining a position and rotation of the receiver in the GRF using the determined position and rotation of the transmitter in the GRF.

13. The non-transitory computer readable storage medium of claim 12, the method further comprising:
determining a position and rotation of another receiver in the GRF using the determined position and rotation of the transmitter in the GRF.

* * * * *